(12) United States Patent
Critchfield

(10) Patent No.: US 7,682,459 B1
(45) Date of Patent: Mar. 23, 2010

(54) DRIVE CHAIN CLEANING DEVICE

(76) Inventor: Scott L. Critchfield, 10395 Gala Ave., Alta Loma, CA (US) 91701

( * ) Notice: Subject to any disclaimer, the term of this patent is extended or adjusted under 35 U.S.C. 154(b) by 292 days.

(21) Appl. No.: 11/881,051

(22) Filed: Jul. 25, 2007

(51) Int. Cl.
*B08B 7/00* (2006.01)
(52) U.S. Cl. .......................................... 134/9; 134/140
(58) Field of Classification Search ........................ None
See application file for complete search history.

(56) References Cited

U.S. PATENT DOCUMENTS

| 613,833 A | * | 11/1898 | Baldwin | ...................... 118/419 |
| 4,280,581 A | * | 7/1981 | Rudwick | ...................... 180/207 |
| 4,578,120 A | | 3/1986 | Chiarella | |
| 4,944,434 A | * | 7/1990 | Hamilton | ...................... 224/549 |

* cited by examiner

*Primary Examiner*—Michael Barr
*Assistant Examiner*—Jason Y Ko
(74) *Attorney, Agent, or Firm*—Eric Karich

(57) ABSTRACT

A cleaning device for cleaning a drive chain has a shaft, a motor for rotatably mounting the shaft, and a mounting element for mounting the motor such that the shaft is generally horizontal. A sprocket is mounted on the shaft with a wing nut such that the sprocket rotates with the shaft. The sprocket has teeth for engaging the drive chain. The cleaning device is adapted to be mounted over a container of a cleaning fluid for cleaning the drive chain.

3 Claims, 6 Drawing Sheets

DRIVE CHAIN CLEANING DEVICE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to cleaning devices, and more particularly to a cleaning device adapted for cleaning a motorcycle or industrial drive chain.

2. Description of Related Art

Many vehicles, machines, or various types of equipment include a drive chain for transferring rotational movement between locations. These drive chains require constant maintenance to remove dirt and other contaminants, and to re-grease the freshly cleaned chains.

Since cleaning the drive chain is a dirty and awkward job, various forms of chain cleaning devices are known in the art. For example, Chiarella, U.S. Pat. No. 4,578,120, teaches a bicycle chain cleaning or lubricating device and method adapted for cleaning or lubricating a bicycle chain.

The Chiarella device enables the bicycle chain to be cleaned in place, without need for the removal and replacement of the chain. The device includes a receptacle for enclosing a portion of a bicycle chain to be cleaned or lubricated and for containing a quantity of solvent or lubricant and a mating cover for the receptacle. The cover contains at least one rotatable sprocket brush having spaced-apart bristle tufts on its periphery and sized to fit closely into adjacent spaces in the bicycle chain, so that the movement of the chain through the device causes the chain and central brush to dip into the solvent or lubricant and then enter the spaces of the chain so as to clean or lubricate the chain as it is passed through the device. The receptacle and cover of the device are held together by suitable retainer means, such as a wire clamp located at the central portion of the device casing. Also, one or two secondary rotary sprocket brushes designed for interfitting into the openings of the chain are preferably provided in the receptacle for use in combination with the central primary sprocket. A stationary brush or absorbent pad can be attached to the device exit end to contact the chain and remove excess material from the moving chain.

Other prior art cleaning devices are also known in the art, and the above-described reference is hereby incorporated by reference in full.

The prior art teaches various forms of chain cleaning devices that function to run a chain through a cleaning solution. However, the prior art does not teach a drive chain cleaning device having the structure and function of the present invention. The present invention fulfills these needs and provides further related advantages as described in the following summary.

SUMMARY OF THE INVENTION

The present invention teaches certain benefits in construction and use which give rise to the objectives described below.

The present invention provides a cleaning device for cleaning a drive chain. The cleaning device comprises a shaft; a motor for rotatably mounting the shaft; a mounting element for mounting the motor such that the shaft is generally horizontal; a sprocket having teeth for engaging the drive chain; and a sprocket locking element for locking the sprocket on the shaft such that the sprocket rotates with the shaft.

A primary objective of the present invention is to provide a cleaning device having advantages not taught by the prior art.

Another objective is to provide a cleaning device that can quickly and easily clean a drive chain.

Another objective is to provide a cleaning device that is adjustable to enable the cleaning of drive chains of different sizes and lengths.

A further objective is to provide a cleaning device that is capable of cleaning multiple drive chains at the same time.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above-described drawing figures illustrate the invention, a cleaning device 10 for cleaning a drive chain 12.

Figure 1:
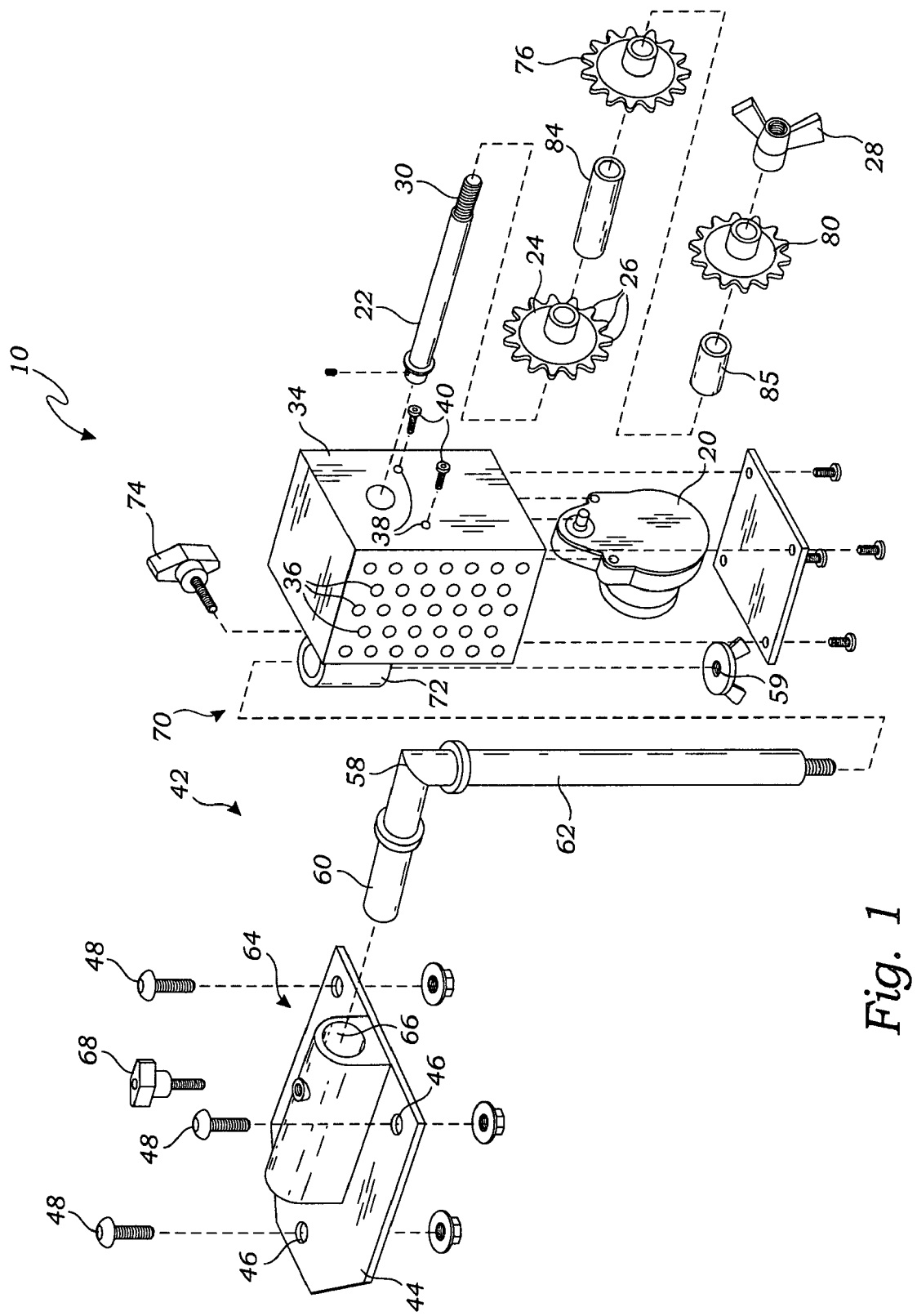
FIG. 1 is an exploded perspective view of a cleaning device according to a preferred embodiment of the present invention.
Figure 2:
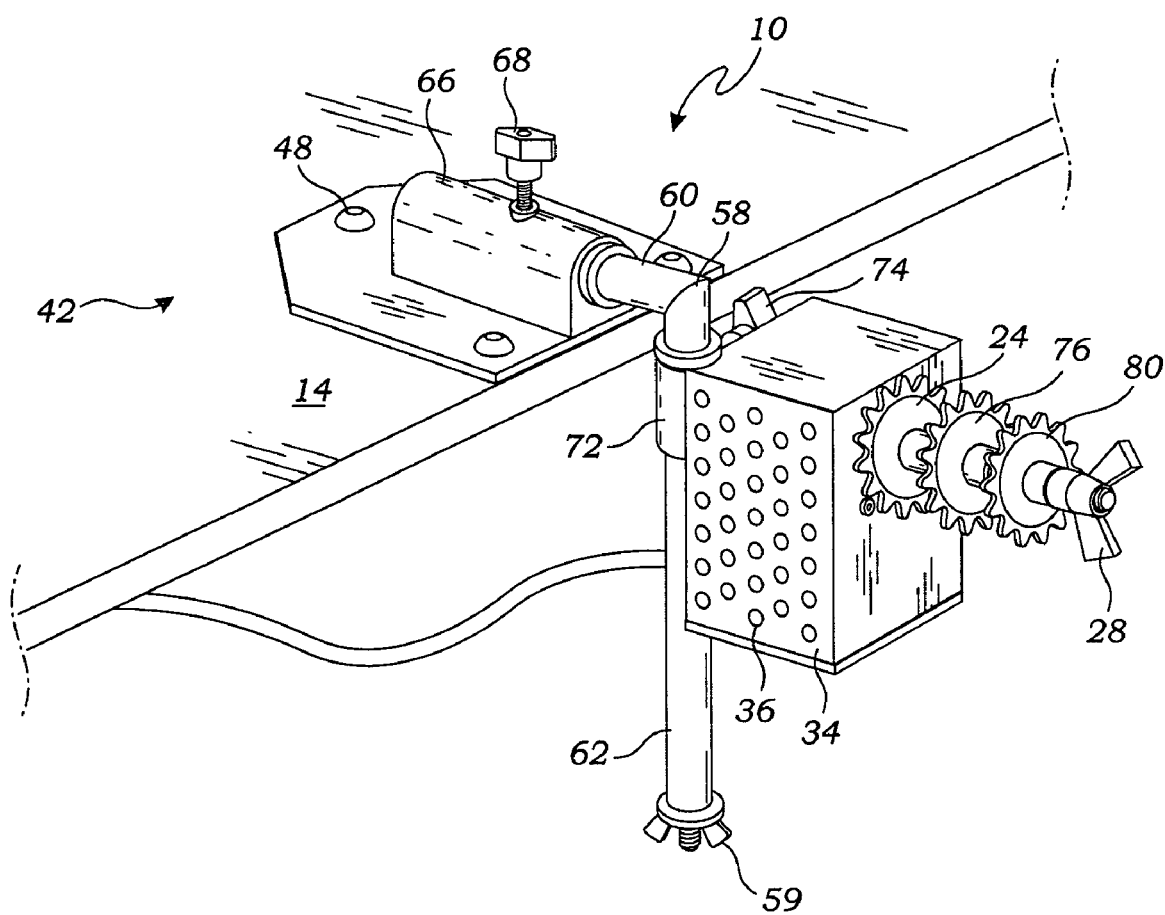
FIG. 2 is a perspective view of the cleaning device once it has been assembled, the cleaning device having a first embodiment of a mounting element, a base element bolted to a surface, and a motor of the cleaning device being illustrated in a raised position on an L-shaped adjustment arm.

FIG. 1 is an exploded perspective view of the cleaning device 10 according to a preferred embodiment of the present invention. FIG. 2 is a perspective view of the cleaning device once it has been assembled. As shown in FIGS. 1 and 2, the cleaning device 10 includes a motor 20 and a shaft 22 rotatably mounted on the motor 20. A sprocket 24 is mounted on the shaft 22 and includes teeth 26 for engaging the drive chain 12 (shown in FIG. 5). A sprocket locking element 28 is provided for locking the sprocket 24 on the shaft 22 such that the sprocket 24 rotates with the shaft 22.

Figure 5:
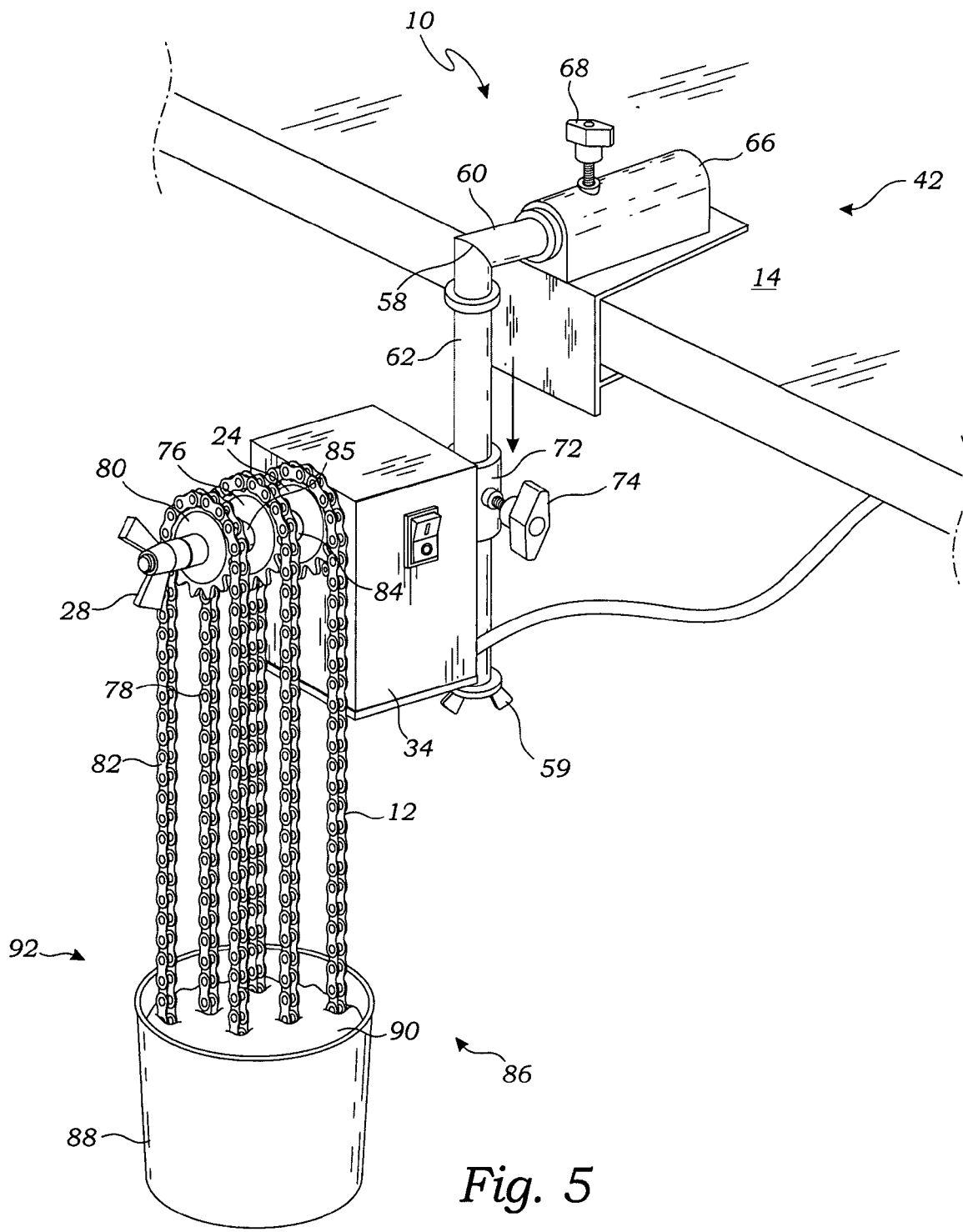
FIG. 5 is a perspective view of the cleaning device of FIG. 4 having three sprockets being used to clean three drive chains in a container of a cleaning solution.

In the embodiment of FIGS. 1 and 2, there are three sprockets, however, the cleaning device may include one, two, three, or even more sprockets, depending upon the number of drive chains to be cleaned. This is discussed in greater detail below, and the mounted drive chains are illustrated in FIG. 5.

In the preferred embodiment, the motor 20 is an electrical motor having enough power to rotate the drive chain 12, as illustrated and described in greater detail below. In the preferred embodiment, the motor 20 is mounted within a motor housing 34 adapted to receive the motor 20. The motor housing 34 preferably includes walls having ventilation apertures 36, and mounting apertures 38 for receiving screws 40 for fastening the motor 20 within the motor housing 34. The motor housing 34 may have any construction known to those skilled in the art, and may also be integral with the construction of the motor 20.

The cleaning device 10 further includes a mounting element 42 for mounting the motor 20 such that the shaft 22 is generally horizontal. In the embodiment of FIG. 1, the mounting element 42 includes a base element 44 that is generally planar and is adapted to fasten the motor 20 to a surface 14 such as a work bench or similar structure. In the embodiment of FIG. 1, the base element 44 is generally planar and includes a plurality of mounting apertures 46, and a plurality of fasteners 48 adapted to engage the mounting apertures 38 for fastening the base element 44 to the surface 14. The fasteners 48 may be nuts/bolts, as illustrated in FIG. 1, screws, or any other suitable mounting or fastening mechanism known in the art.

Figure 3:
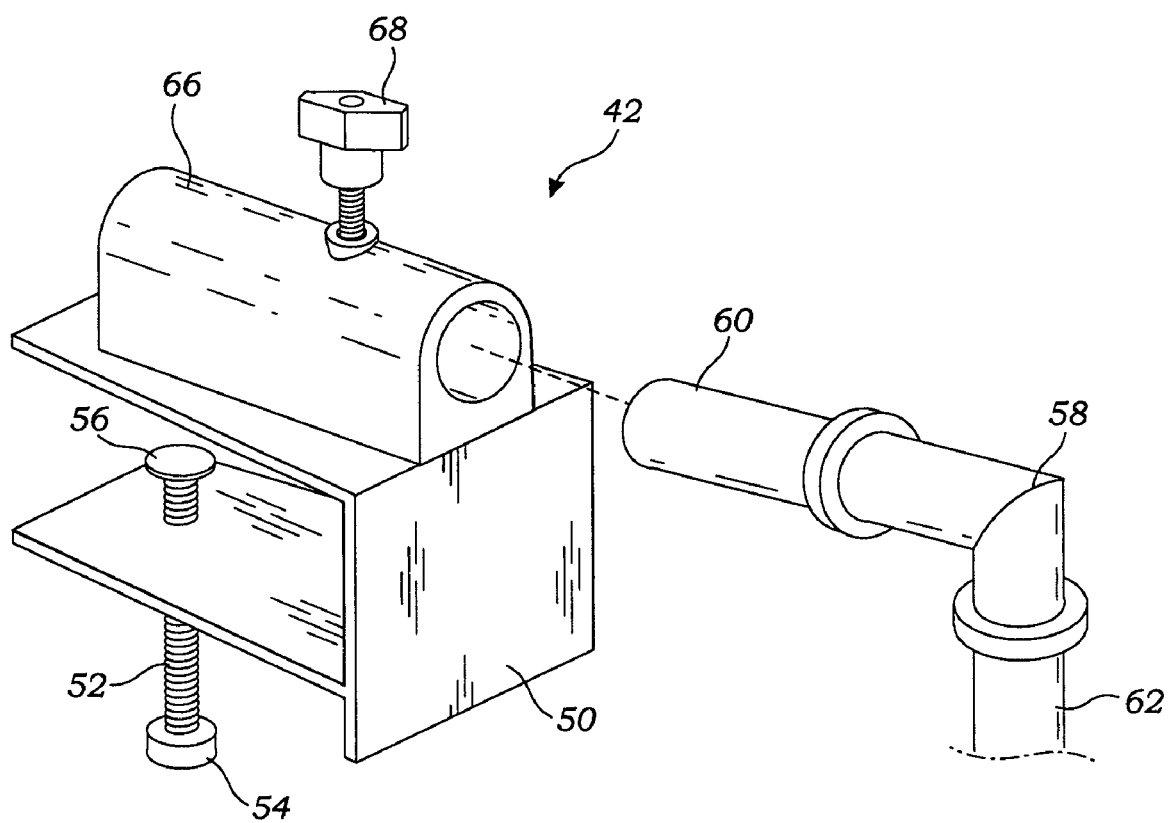
FIG. 3 is an exploded perspective view of an alternative embodiment of the mounting element, including a U-shaped base element that is adapted to clamp onto the surface.

In another embodiment, illustrated in FIG. 3, the mounting element 42 includes a U-shaped base element 50 for fitting around the surface 14, and a clamp element 52 threadedly engaging the U-shaped base element 50 such that rotation of the clamp element 52 with a head portion 54 moved a contact portion 56 against the surface 14 to clamp the U-shaped base element 50 against the surface 14. This embodiment enables the cleaning device 10 to be readily removed from storage, attached to the surface 14, used, and then later removed and placed back in storage.

The mounting element 42 is adapted to facilitate the adjustment of the positioning of the motor 20 and the shaft 22. In the embodiments of FIGS. 1-3, the mounting element 42 preferably includes an adjustment arm 58 for adjusting the vertical position of the motor 20 with respect to the surface 14. In the preferred embodiment, the adjustment arm 58 is an L-shaped adjustment arm having a horizontal arm 60 extending from a vertical arm 62. In this embodiment, the base element 44 has a horizontal adjustment element 64, and the horizontal arm 60 of the L-shaped adjustment arm 58 is adapted to engage the horizontal adjustment element 64 of the base element 44 for horizontal adjustment of the motor 20 with respect to the mounting element 42. Furthermore, the vertical arm 62 of the L-shaped adjustment arm 58 is adapted to engage a vertical adjustment element 70 of the motor housing 34. The vertical adjustment element 70 enables the vertical adjustment of the motor 20 with respect to the surface 14.

In the preferred embodiment, the horizontal adjustment element 64 of the base element 44 includes a cylindrical receiver 66 shaped to receive the horizontal arm 60 of the L-shaped adjustment arm 58, and a locking screw 68 adapted to extend through and threadedly engage the cylindrical receiver 66 to abut and lock the horizontal arm 60 within the cylindrical receiver 66.

Similarly, in the preferred embodiment, the vertical adjustment element 70 includes a cylindrical receiver 72 shaped to receive the vertical arm 62 of the L-shaped adjustment arm 58, and a locking screw 74 adapted to extend through and threadedly engage the cylindrical receiver 72 to abut and lock the vertical arm 62 within the cylindrical receiver 72.

Figure 4:
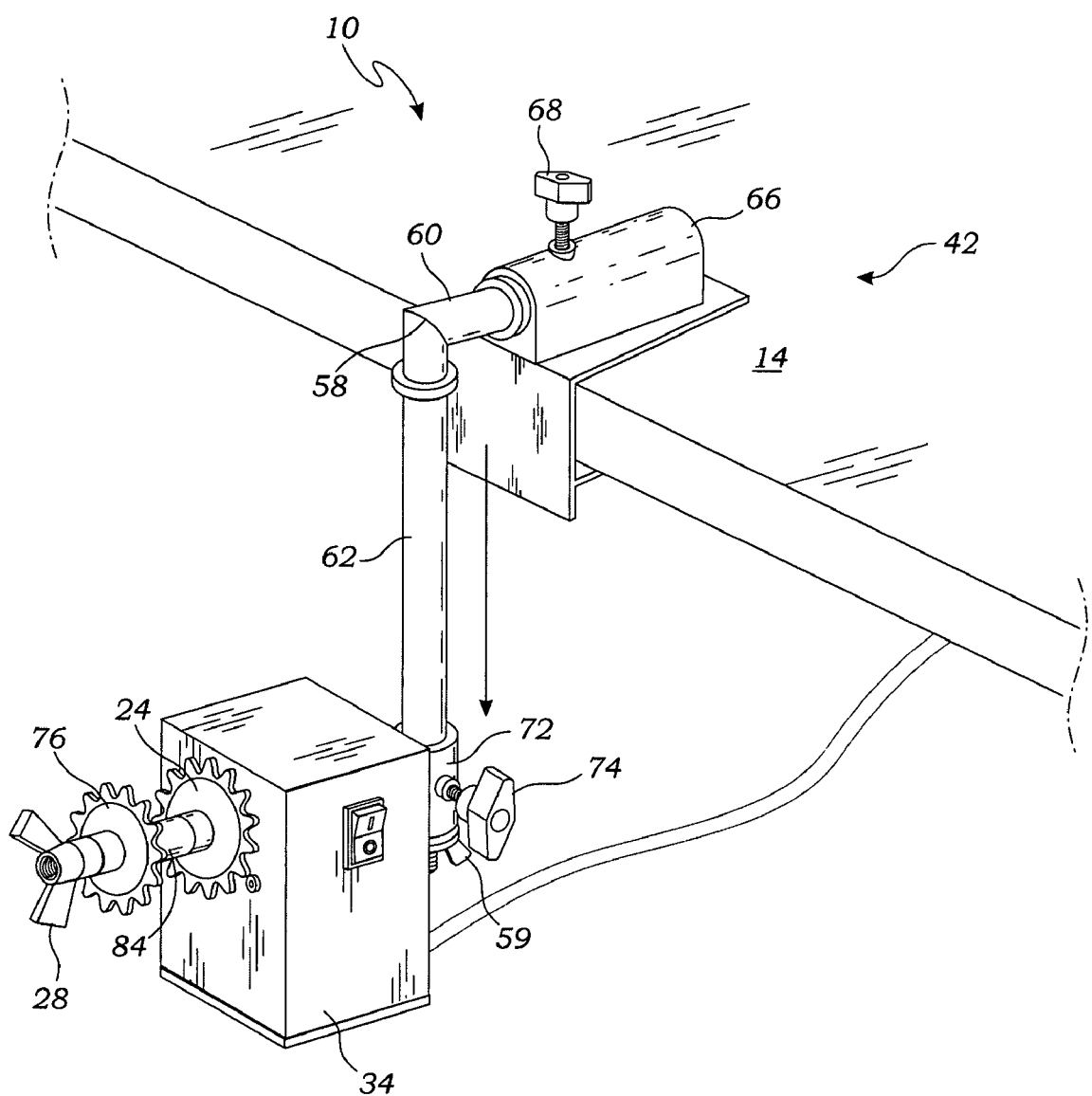
FIG. 4 is an alternative embodiment of the cleaning device of FIG. 2, illustrating the U-shaped base element, two sprockets, and the motor of the cleaning device being illustrated in a lowered position on an L-shaped adjustment arm.

FIG. 3 illustrated the motor housing 34 in a raised position on the L-shaped adjustment arm, FIG. 4 illustrates the motor housing 34 in a lowered position on the L-shaped adjustment arm, and FIG. 5 illustrated the motor housing 34 in a middle position thereupon.

Obviously, those skilled in the art can devise alternative structures to provide the horizontal adjustment element 64 and the vertical adjustment element 70. For example, various sliding and/or pivoting mechanisms may be used to enable the adjustment, and a variety of locking pins or similar structures may be used to lock the cleaning device 10 in the proper position. These and other alternatives and equivalent constructions should be considered within the scope of the present invention.

While the sprocket 24 is sometimes discussed in the singular for the sake of clarity, in the preferred embodiment multiple sprockets may be used to enable the simultaneous cleaning of multiple drive chains. In the embodiment of FIG. 4, the cleaning device 10 includes a second sprocket 76 removably mounted on the shaft 22 and adapted for hanging a second drive chain 78 on the shaft 22. In the embodiment of FIGS. 1, 2, and 5, the cleaning device 10 further include a third sprocket 80 removably mounted on the shaft 22 and adapted for hanging a third drive chain 82 on the shaft 22. In this embodiment, the sprocket locking element 28 preferably includes a wing nut 28 adapted to threadedly engage a threaded end 30 of the shaft 22 to removably lock the sprocket 24, the second sprocket 76, and the third sprocket 80 on the shaft 22. In the most preferred embodiment, the sprocket locking element 28 further includes a rigid cylindrical spacer element 84 positioned around the shaft 22 and between the first sprocket 24 and the second sprocket 76. Additional spacers 85 may be used between the second sprocket 76 and the third sprocket 80, and others. The rigid cylindrical spacer element 84 and the additional spacers function to maintain the sprockets in their proper locations, and fixedly locked by the wing nut 28.

In the preferred embodiment, as illustrated in FIG. 5, the cleaning device 10 is part of a cleaning kit 86 adapted for cleaning the drive chain(s) 12. The cleaning device 10 described above is mounted on the surface 14, and a container 88 is provided that is adapted for holding a cleaning fluid 90 and for receiving a portion 92 of the drive chain 12 such that the portion 92 of the drive chain 12 is immersed in the cleaning fluid 90. The container 88 is preferably a bucket. The cleaning fluid 90 may be any cleaning and/or lubricating fluid known in the art that is adapted for the drive chain(s) 12 being cleaned and maintained.

The cleaning device 10, and the cleaning kit 86, enable a novel method for cleaning the drive chains 12, best illustrated in FIG. 5. According to the preferred method, once the cleaning device 10 described above has been mounted on the surface 14, the container 88 is positioned beneath the cleaning device 10, and is partially filled with the cleaning fluid 90. The drive chain 12 is then hung from the sprocket 24. The sprocket 24 is preferably selected to include teeth 26 that are particularly suited for the drive chain 12 being cleaned, so particular sprockets will be selected depending upon the drive chain(s) being cleaned.

Once the drive chain 12 has been mounted on the sprocket 24, the motor housing 34 and the vertical adjustment element 72 may be adjusted with respect to the vertical arm 62 of the L-shaped adjustment arm 58 such that a portion 92 of the drive chain 12 is immersed in the cleaning fluid 90. This adjustment capability is helpful to adjust the cleaning device 10 to drive chains of differing lengths. In the preferred embodiment, the locking screw 74 is loosened within the cylindrical receiver 72 so that the vertical arm 62 of the L-shaped adjustment arm 58 may be moved with respect to the motor housing 34. When properly positioned, the locking screw 74 is again tightened.

Similarly, the horizontal arm 60 of the L-shaped adjustment arm 58 may be adjusted, via the locking screw 68, with respect to the horizontal adjustment element 64 to adjust the horizontal position of the motor housing 34 with respect to the surface 14.

Once positioned and adjusted appropriately, the motor 20 is started so that the drive chain 12 rotates about the sprocket 24 and through the cleaning fluid 90, thereby cleaning the drive chain 12. If multiple drive chains are mounted on multiple sprockets, they will all be cleaned in a similar manner. If the second sprocket 76 is removably mounted on the shaft 22, for example, and the second drive chain 78 is mounted around the second sprocket 76, both the first and second drive chains 12, 78 will be cleaned. Similarly, locking the third sprocket 80 on the shaft 22 enables cleaning of the third drive chain 82. In the preferred embodiment, the rigid cylindrical spacer element 84 is positioned on the shaft 22 between the sprocket 24 and the second sprocket 76 to maintain proper spacing and to enable the wing nut 28 to removably lock the sprocket 24, the rigid cylindrical spacer element 84, and the second sprocket 76 on the shaft 22.

Figure 6:
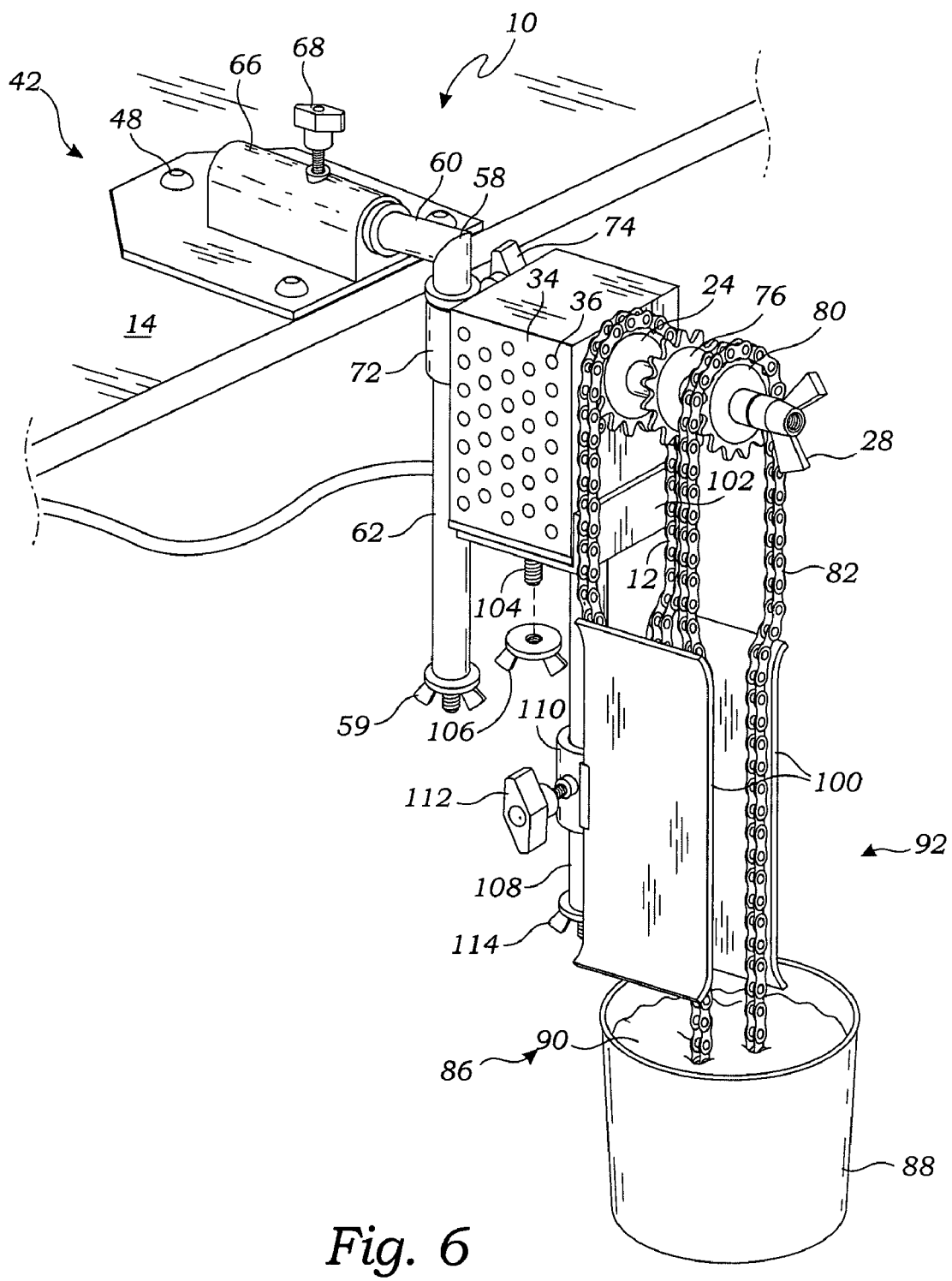
FIG. 6 is a perspective view of the cleaning device, illustrating a chain guide mounted on the motor housing.

FIG. 6 illustrates an alternative embodiment in which a chain guide 100 is mounted to the cleaning device 10 with a chain guide mounting element 102. In one embodiment, the chain guide mounting element 102 is a bracket is attached to the underside of the motor housing 34. The bracket 102 may be affixed the to the motor housing 34 by a screw 104, which extends through the bottom of the motor housing 34 and the bracket 102. A wing nut 106 is then screwed onto the screw 104 and tightened to hold the bracket 102 and motor housing 34 together. The bracket 102 supports a vertical arm 108 which extends downward from beneath the motor housing 34. A cylindrical adjustment element 110 is mounted on the vertical arm 108 and can slide up or down, adjusting to various heights. A screw and wing nut assembly 114 is attached to the bottom of the vertical arm 108 to ensure the cylindrical adjustment element 110 does not slip off of the vertical arm 108. The cylindrical adjustment element 110 can be held in a fixed position by tightening a locking screw 112, which passes through the adjustment element 110 and locks down on the vertical arm 108. The adjustment element 110 supports the chain guides 100, which are laterally spaced and positioned below the sprockets 24, 76, and 80. As the chains 12 travel around the sprockets 24, 76, and 80, the chain guides 100 serve to guide the chains into the cleaning fluid 90 and ensure they do not get twisted or entangled. The chain guides 100 may be adjusted vertically up and down the vertical arm 108, by way of the cylindrical adjustment element 110, to accommodate chains of varying length.

While at least one preferred embodiment of the present invention is illustrated above, it should be understood that the presently claimed invention includes alternative embodiments that could be devised by those skilled in the art. The terminology used in the preceding description should be construed to include not only the words used above, but also similar or equivalent words, and alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A cleaning device for cleaning a drive chain adjacent a work bench surface, the cleaning device comprising:
    a shaft;
    a motor for rotatably mounting the shaft;
    a motor housing adapted to receive the motor, the motor housing having a vertical adjustment receiver;
    a base element being adapted to be mounted on the work bench surface;
    a vertical arm extending downwardly from the base element to engage the vertical adjustment receiver of the motor housing for vertical adjustment of the motor with respect to the mounting element,
    a locking screw of the vertical adjustment receiver adapted to extend through and threadedly engage the vertical adjustment receiver to abut and lock the vertical arm within the vertical adjustment receiver;
    a sprocket having teeth for engaging the drive chain;
    a sprocket locking element for locking the sprocket on the shaft such that the sprocket rotates with the shaft; and
    a container of a cleaning fluid, the container being shaped for receiving a portion of the drive chain, such that the portion of the drive chain may be immersed in the cleaning fluid when the motor housing is adjusted downwardly on the vertical arm and locked in place with the locking screw of the vertical adjustment receiver.

2. The cleaning device of claim 1, wherein the mounting element includes a U-shaped base element for fitting around the work bench surface, and a clamp element threadedly engaging the U-shaped base element such that rotation of the clamp element with a head portion moved a contact portion against the work bench surface to clamp the U-shaped base element against the work bench surface.

3. A cleaning device for cleaning a drive chain adjacent a work bench surface, the cleaning device comprising:
    a shaft;
    a motor for rotatably mounting the shaft;
    a motor housing adapted to receive the motor, the motor housing having a vertical adjustment receiver;
    a base element being adapted to be mounted on the work bench surface and having a horizontal adjustment receiver;
    an L-shaped adjustment arm having a horizontal arm and a vertical arm, wherein the horizontal arm of the L-shaped adjustment arm engages the horizontal adjustment receiver of the base element for horizontal adjustment of the motor with respect to the mounting element, and wherein the vertical arm of the L-shaped adjustment arm engages the vertical adjustment receiver for vertical adjustment of the motor with respect to the mounting element;
    a locking screw of the horizontal adjustment receiver adapted to extend through and threadedly engage the horizontal adjustment receiver to abut and lock the horizontal arm within the horizontal adjustment receiver;
    a locking screw of the vertical adjustment receiver adapted to extend through and threadedly engage the vertical adjustment receiver to abut and lock the vertical arm within the vertical adjustment receiver;
    a sprocket having teeth for engaging the drive chain;
    a sprocket locking element for locking the sprocket on the shaft such that the sprocket rotates with the shaft; and
    a container of a cleaning fluid, the container being shaped for receiving a portion of the drive chain such that the portion of the drive chain is immersed in the cleaning fluid.

* * * * *